UNITED STATES PATENT OFFICE.

GUSTAVE BERNSTEIN, OF ROYAT, FRANCE.

VULCANIZATION OF RUBBER AND OTHER SIMILAR SUBSTANCES.

1,240,116.  Specification of Letters Patent.  Patented Sept. 11, 1917.

No Drawing.  Application filed July 18, 1913. Serial No. 779,846.

*To all whom it may concern:*

Be it known that I, GUSTAVE BERNSTEIN, a subject of the Russian Emperor, residing at Royat, Puy-de-Dôme, France, have invented a new and useful Improvement in the Vulcanization of Rubber and other Similar Substances, of which the following is a specification.

The invention relates to the vulcanization of rubber and similar substances. Essentially, the process consists in exposing india rubber or similar substances to the action of violet and ultra-violet rays.

Up to the present time the process of vulcanizing rubber or similar substances was effected by subjecting the india rubber compound mixed with sulfur or sulfids to the action of heat or by subjecting the india rubber to the action of chlorid of sulfur in its solid, liquid or gaseous state.

Vulcanization by heat entailed the inconvenience of requiring a considerable plant; the operation, furthermore, is a lengthy one, and, in addition, this process does not permit the incorporation of compounds or substances which are decomposed by heat such as for instance, leather and coloring matter.

The second process by means of chlorid of sulfur produces noxious effects upon the workmen, gives irregular results and does not allow of the addition of compounds or substances which react with chlorid of sulfur such as, for instance, lead oxid, lead carbonate, zinc oxid, etc.

These various disadvantages are avoided by the present process which consists in the exposure of the rubber mixed with sulfur, sulfids or other vulcanizing agent to the action of the violet or the ultra-violet rays.

This vulcanization can be assisted viz: hastened, by the simultaneous or separate application of two other vulcanizing agents, viz: heat and pressure.

In this case it becomes unnecessary to utilize high temperature which would of itself produce vulcanization, and it is sufficient to operate at a temperature of from 65° C. to 80° C.

The temperature in fact depends upon the nature of the gum, viz: upon its degree of polymerization. With the Massaï gum for instance, a temperature higher than for Pará gum will be required and under these conditions a Madagascar gum will be vulcanized at a temperature of 65° C. It is known that it is impossible to obtain vulcanization by means of so low a temperature but it immediately becomes possible with the assistance of ultra-violet rays.

The object in applying pressure is not only to hasten the vulcanization but also to prevent the formation of blisters upon the surface of the vulcanized compound. These blisters result from the expansion of air introduced into the compound during the process of manufacture and from the traces of moisture previously absorbed by the gum.

In the ordinary process of vulcanization a contraction of the surface of the material takes place and a similar phenomenon occurs in vulcanization by means of ultra-violet rays. The vulcanized surface contracts while the interior not being vulcanized does not suffer any contraction. While the vulcanization by ultra-violet rays is not rapid as in the case of vulcanization by sulfur monochlorid, there is a progressive contraction accompanied by the formation of fissures, and this may be avoided by operating under pressure, a pressure of 2 to 3 kilogs. per square centimeter of surface being sufficient. As a matter of fact, in the case under consideration, the surface of the object treated being wholly vulcanized possesses sufficient resistance to withstand the pressure from the lower material, that is to say, from within.

It is known that in vulcanization by means of hot air it is necessary to incorporate some accelerators in the mixture, such, as, say, lead oxid or magnesia, etc. In the case of photochemical rays, however, the employment of these accelerators becomes unnecessary, the superficial vulcanization progressing spontaneously toward the inner portion of the object under treatment so that the vulcanization becomes complete.

The action of the photochemical rays appears, in fact to be catalytic in nature.

It is also necessary to mention that the surface vulcanized by means of photochemical (ultra-violet) rays protects the subjacent substance from any secondary reaction such as, for instance, its resinification.

To sum up, the combined action of the photochemical (ultra-violet) rays and heat render possible the process of vulcanization without the use of lead oxid or similar substances. It is also possible to obtain a homogeneous vulcanization in those cases when the surface of the object under treatment is composed of a substance vulcanizing slowly and the inner portion of a mixture vulcanizing rapidly; this is the case when lead oxid cannot be incorporated in order to avoid a black coloration. In this case heat will easily vulcanize the inside portion of the object under treatment and the vulcanization of the surface will be hastened by the action of the photochemical rays.

In order to avoid the formation of ozone produced by the action of the ultra-violet rays the operation may, eventually, be carried out *in vacuo* or in an atmosphere consisting of a neutral gas not containing oxygen. The vulcanization can be effected in any suitable receptacle containing one or several mercury vapor quartz lamps. Said lamps may be of the 110, 220, or 500 volts, and of the Westinghouse Cooper Hewitt, or of the Heraeus type. The necessary pressure in the receptacle may be obtained by means of an air pump, or by any other suitable contrivance.

The number and arrangement of the lamps will be governed by the surface to be vulcanized. The lamps may be arranged and controlled by any suitable means.

The time required for the vulcanizing process will depend upon the nature of the gum employed, the distance of the lamp or lamps from the surface under treatment, the nature of the substance and the power of the lamp or lamps. All these factors must be determined conjointly and in a rational manner.

With a Heraeus lamp of 110 volts and 3 amperes the vulcanization process takes place in a very short time, the distance between the lamp and the surface to be vulcanized being 10 centimeters.

A benzin solution containing 3% of Hevea gum and 6% of sulfur, the whole incorporated to form after evaporation a film in solid state contained 2.56% of combined sulfur after being exposed for 40 minutes to the action of a 110 volt 3 amperes mercury vapor quartz lamp placed at a distance of 13 centimeters from the surface under treatment.

As a second example; a benzin solution containing 3% of Hevea gum with 6% of sulfur the whole incorporated to form a thin liquid film ½ to 3 millimeters in thickness contained 1.5% to 2.5% of combined sulfur after being exposed a few seconds at ordinary temperature and at a distance of three centimeters to the action of a 220 volt 3 ampere mercury vapor quartz lamp, a current of water in a thin film being interposed between the mercury vapor quartz lamp and the material under treatment.

What I claim is:

1. A process for vulcanizing rubber substance which consists in submitting the substance at high temperature in the presence of sulfur, sulfids or other vulcanizing agents to the action of ultra-violet rays.

2. A process for vulcanizing rubber substance which consists in submitting the substance under pressure in the presence of sulfur, sulfids or other vulcanizing agents to the action of ultra-violet rays.

3. A process for vulcanizing rubber substance which consists in submitting the substance at high temperature and under pressure in the presence of sulfur, sulfids or other vulcanizing agents to the action of ultra-violet rays.

4. A process for vulcanizing rubber substance which consists in submitting the substance in the presence of sulfur, sulfids or other vulcanizing agents to the action of ultra-violet rays in an atmosphere of a neutral gas not containing oxygen.

5. A process for vulcanizing rubber solution which consists in submitting the solution in a thin liquid film and in the presence of sulfur, sulfids or other vulcanizing agents to the action of ultra-violet rays.

6. A process for vulcanizing rubber or similar substances, which consists in submitting the substance in the presence of sulfur, sulfids or other vulcanizing agents to the action of photochemical rays to effect the vulcanization.

7. A process for vulcanizing rubber or similar substances, which consists in submitting the substance in the presence of sulfur, sulfids or other vulcanizing agents to the action of ultra-violet rays to effect the vulcanization.

8. A process for vulcanizing rubber solution, which consists in submitting the solution in the presence of sulfur, sulfids or other vulcanizing agents to the action of ultra-violet rays.

9. A process for vulcanizing a rubber substance in solution, which consists in submitting the substance or solution in a thin film and in the presence of sulfur, sulfids or other vulcanizing agents to the action of ultra-violet rays.

10. A process for vulcanizing rubber substances, which consists in submitting the substance in the presence of sulfur, sulfids, or other vulcanizing agents to the action of ultra-voilet rays and continuing the exposure until the vulcanization is complete and discontinuing the exposure before excessive deterioration of the rubber takes place.

11. A process for vulcanizing rubber substances, which consists in covering with water the substance to be vulcanized, said substance being in the presence of sulfur, sulfids or other vulcanizing agents and thereafter exposing the substance through the water to ultra-violet rays.

In testimony whereof I affix my signature in presence of two witnesses.

DR. GUSTAVE BERNSTEIN.

Witnesses:
    LIVEBARDON MARTIN,
    G. ROURE.